(12) United States Patent
Lanphier

(10) Patent No.: US 7,048,462 B2
(45) Date of Patent: May 23, 2006

(54) NEWEL ANCHORAGE SYSTEM

(76) Inventor: Lee Lanphier, 1750 Anderson Creek Rd., Talent, OR (US) 97540

( * ) Notice: Subject to any disclaimer, the term of this patent is extended or adjusted under 35 U.S.C. 154(b) by 88 days.

(21) Appl. No.: 10/158,304

(22) Filed: May 29, 2002

(65) Prior Publication Data
US 2003/0223807 A1 Dec. 4, 2003

(51) Int. Cl.
*E04F 11/18* (2006.01)

(52) U.S. Cl. .................. 403/188; 403/231; 403/382; 256/65.14

(58) Field of Classification Search ............... 52/170, 52/720.2, 715, 712; 248/300; 256/65.14; 403/382, 403, 187, 188, 230, 231, 256, 258
See application file for complete search history.

(56) References Cited

U.S. PATENT DOCUMENTS

| | | | | |
|---|---|---|---|---|
| 3,188,696 | A * | 6/1965 | Earhart | 52/241 |
| 3,603,546 | A * | 9/1971 | Ruffert | 248/188 |
| 3,740,022 | A * | 6/1973 | DiGiovanni | 256/24 |
| 4,260,277 | A * | 4/1981 | Daniels | 403/235 |
| 4,295,638 | A | 10/1981 | Eldeen | |
| 4,359,851 | A * | 11/1982 | Daniels | 52/298 |
| 4,367,864 | A | 1/1983 | Eldeen | |
| 4,381,160 | A | 4/1983 | Grimm et al. | |
| 4,854,549 | A | 8/1989 | Roberts et al. | |
| 4,976,085 | A * | 12/1990 | Krueger | 52/715 |
| 5,095,668 | A | 3/1992 | O'Brien et al. | |
| 5,143,472 | A | 9/1992 | Reed et al. | |
| 5,150,982 | A | 9/1992 | Gilb | |
| 5,419,538 | A | 5/1995 | Nicholas et al. | |
| 5,771,646 | A | 6/1998 | DeSouza | |
| 5,794,395 | A | 8/1998 | Reed | |
| 5,902,522 | A * | 5/1999 | Seawell et al. | 261/111 |
| 5,966,892 | A * | 10/1999 | Platt | 52/712 |
| 5,970,677 | A * | 10/1999 | Masters et al. | 52/712 |
| 6,015,138 | A | 1/2000 | Kohlberger et al. | |
| 6,141,928 | A | 11/2000 | Platt | |
| 6,290,212 | B1 | 9/2001 | Bartel | |
| 6,334,287 | B1 * | 1/2002 | Fick | 52/745.11 |
| 6,532,713 | B1 * | 3/2003 | Katayama et al. | 52/729.1 |
| 6,568,657 | B1 * | 5/2003 | Muir | 256/65.06 |

FOREIGN PATENT DOCUMENTS

DE    29812983 U1 * 11/1999

* cited by examiner

*Primary Examiner*—James R. Brittain
(74) *Attorney, Agent, or Firm*—Kolisch Hartwell, P.C.

(57) ABSTRACT

A systematic solution is provided to the anchorage of newel posts designed for building methods that are not conducive to cutting holes in framed flooring or to building in support for posts in the joisting. These brackets connect quickly to newels and anchor anywhere on a floor or platform that has been built to code. They support the newel at the end of a balustrade, on the inside or outside corner of a balcony, or on a long balcony run where center support is critical. They will secure a starting newel for a curb wall or a landing and anchor the wall studding at the same time. Unlike universal brackets, these are job specific and therefore able to meet current or future code requirements without costly failure.

15 Claims, 7 Drawing Sheets

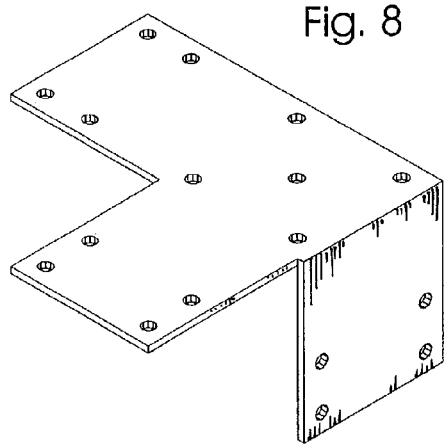
Fig. 8
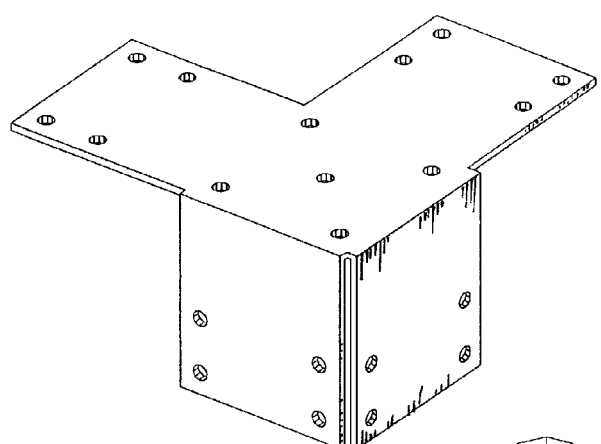
Fig. 9
Fig. 10
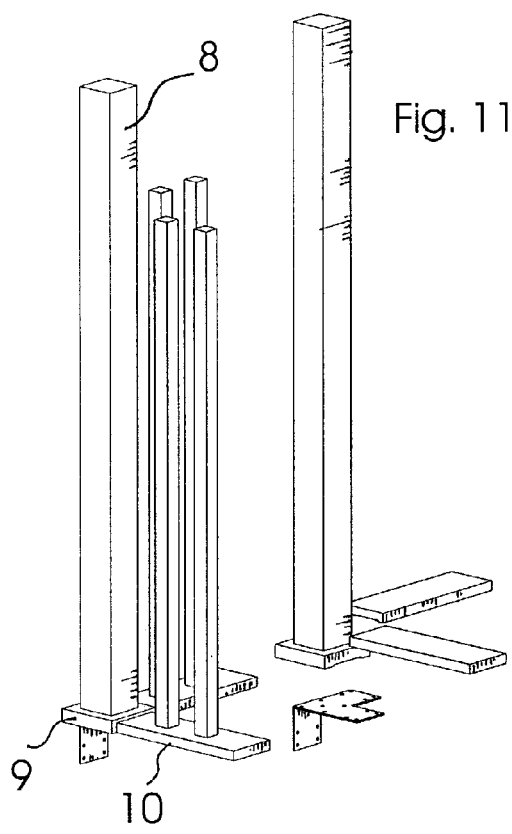
Fig. 11
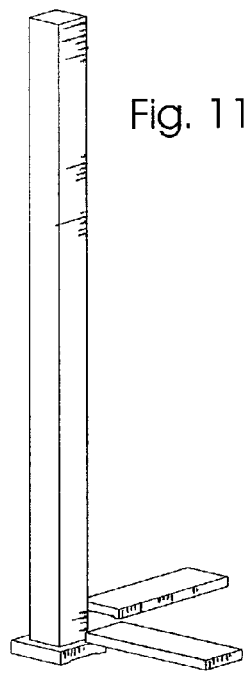
Fig. 12
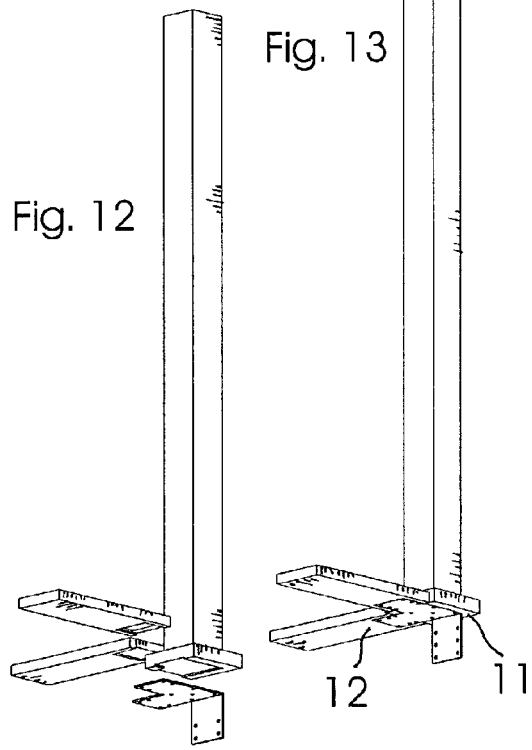
Fig. 13

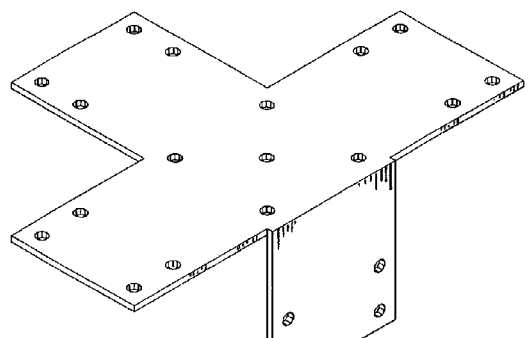
Fig. 19
Fig. 20
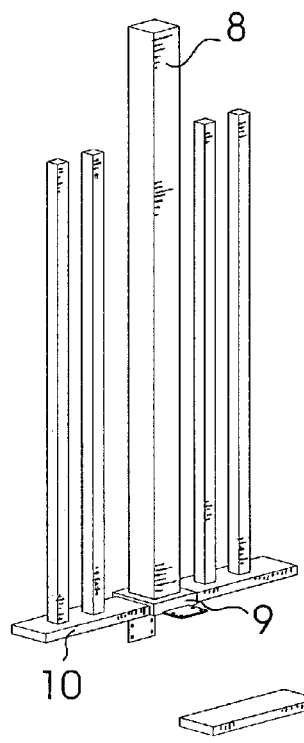
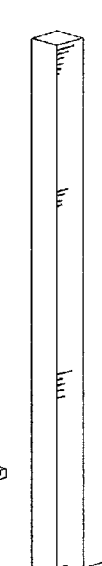
Fig. 21
Fig. 22
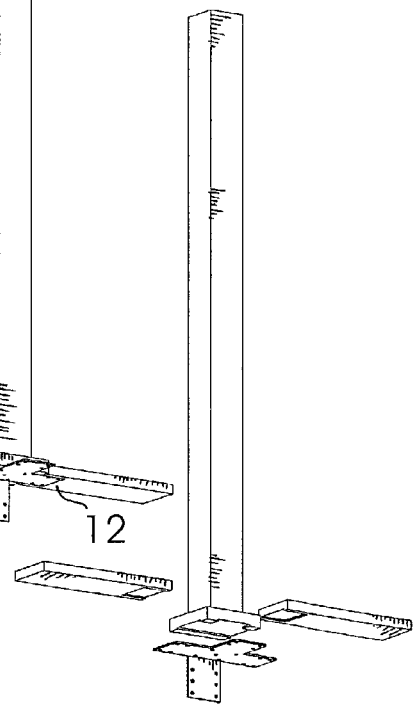
Fig. 23

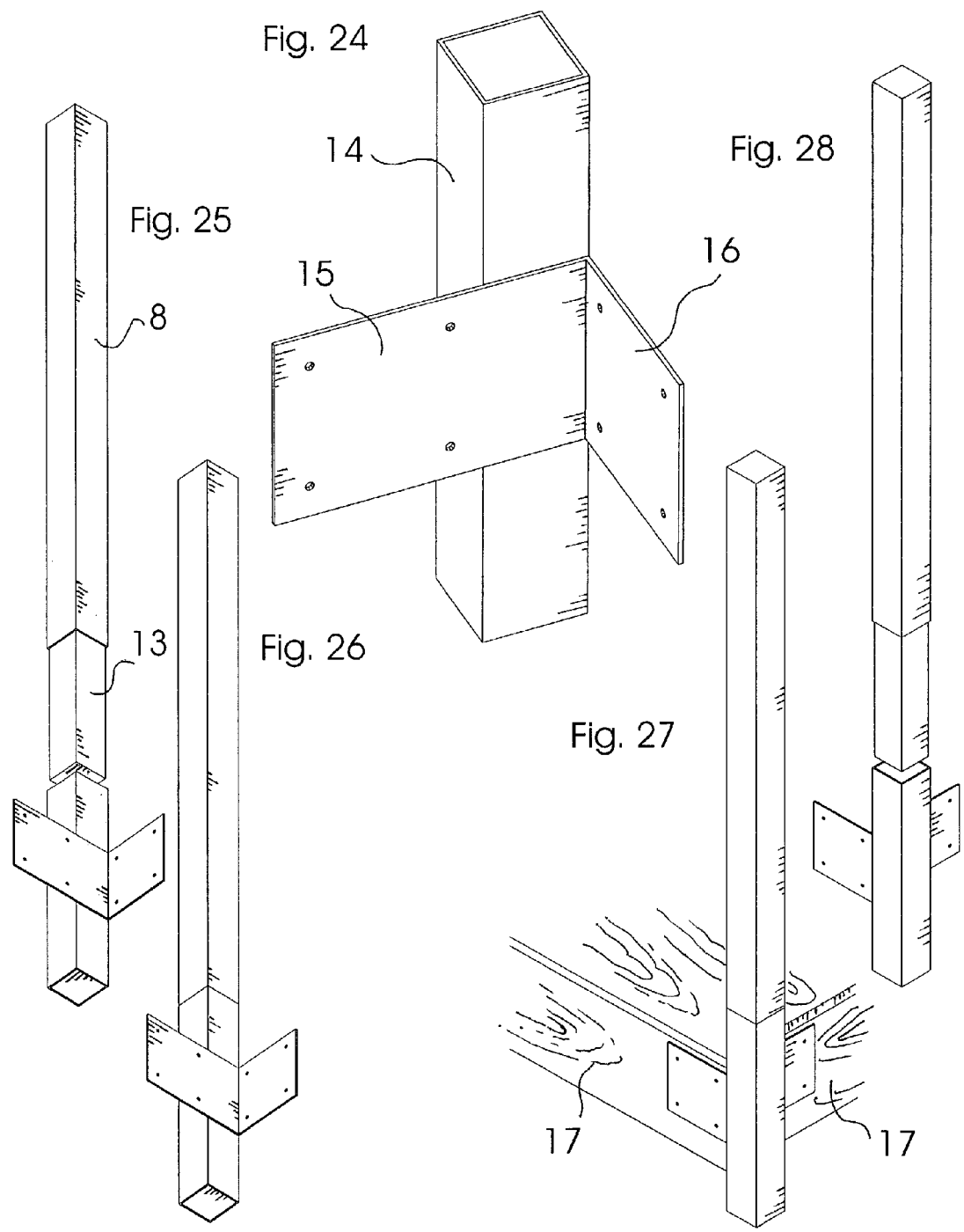

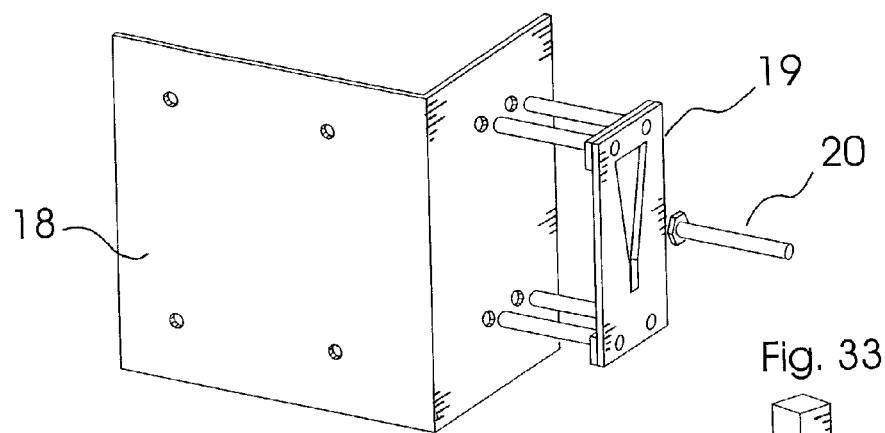
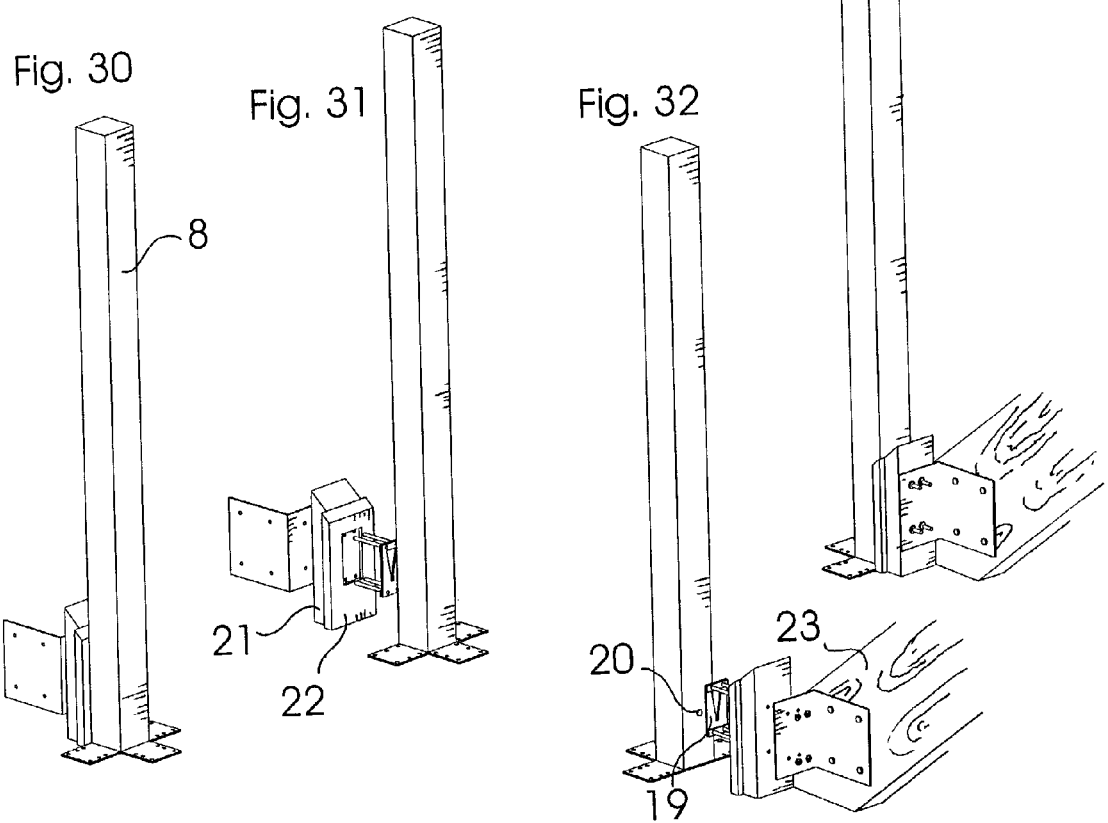

NEWEL ANCHORAGE SYSTEM

CROSS-REFERENCE TO RELATED APPLICATIONS

This application is based upon and claims benefit under 35 U.S.C. § 119(e) of U.S. Provisional Patent Application Ser. No. 60/294,302, entitled "Newel Anchorage System," filed on May 27, 2001, which is incorporated herein by reference.

FIELD OF THE INVENTION

The present invention relates generally to the construction of stairs, and more particularly to brackets for anchoring newels to a floor or platform.

BACKGROUND OF THE INVENTION

Newel posts for stairways and level balustrades are typically anchored only at the bottom, but must withstand tremendous lateral forces applied at hand or guard rail height. Builders have traditionally cut through treads and floors in order to fasten newel posts as much as possible directly to the underlying joisting. However, current building methods and tight production schedules are not conducive to cutting holes in framed flooring, or to building additional support for posts in the joisting. As a result, there have been many attempts to provide improved methods for attaching newels to conventionally framed structures, ranging from surface mount brackets to extra-long bolts.

Eldeen's newel post assembly (U.S. Pat. No. 4,367,864) relies on a flat plate assembled to the transverse bottom surface of the newel post using a plurality of fasteners, one large faster, or U-shaped tie bar. The post assembly depends on small flanges extending out from underneath the newel and a plurality of screws to make the floor anchorage. This type of anchor plate, with its small flanges for floor anchorage, typically exhibits insufficient resistance to deformation, or pull out, when code minimum lateral pressures of 200 lbs. or more are applied at typical hand or guard rail heights.

Bartel's newel anchoring approach (U.S. Pat. No. 6,290, 212) involves a specially developed tubular newel that makes it impractical for all but a very limited number of installations.

The newel anchoring plate featured in the Roberts & Collins U.S. Pat. No. 4,854,549 is even less resistance to deformation and pullout than Eldeen's plate approach.

Grimm's U.S. Pat. No. 4,381,160 utilizes a plurality of corner brackets that mount to the floor and then to the newel. Though the screws into the sides of the newel provide more pullout resistance than endgrain screws such as those used in Eldeen's anchor, the angled extensions through which the floor-mounting screws are fastened do not offer sufficient resistance to floor pullout when code-level lateral pressures are applied.

The same is true of Reed's bracket approach in U.S. Pat. Nos. 5,794,395 and 5,143,472. Though the screws in the sides of the newel hold well, the flanges that are fastened to the floor do not offer sufficient hold-down strength when the posts are subjected to code-level pressures.

Nicholas' U.S. Pat. No. 5,419,538 provides a novel hidden approach to newel attachment, however the newel post fastening system of Nicholas has no ability to withstand code-level lateral pressures. The same is true of the popular key-lock style newel anchorage.

When the lag bolt of O'Brien's newel anchorage (U.S. Pat. No. 5,095,668) penetrates deeply into a solid wood floor or rim joist, the anchorage is very firm below the floor level. The anchorage to the newel requires a large hole drilled up through the center of the newel and a large access hole in its side in order to attach a nut and washer. This makes this system unpopular with builders who do not want unsightly plugs on their newel posts. This system is also prone to disassembly of newel posts composed of softer woods or made of multiple staves when code-level pressure is applied.

The disclosures of all of the above-referenced patents are incorporated herein by reference.

The newel anchoring system disclosed herein offers improved performance relative to previously disclosed newel anchorage methods, and allows surface fastening of newel posts to any conventionally framed wood floor that meets national codes, or concrete floor, Without fear of failure when code-level pressures are applied at hand or guard rail heights. The anchoring system includes eight brackets designed to individually solve the specific newel fastening challenges experienced in conventional building and to provide code-compliant method of attachment of softwood or hardwood newel posts that is quick, easy to use, and reliable. The invention includes normal-duty and heavy-duty inside corner balcony newel-anchoring brackets, normal-duty and heavy-duty outside corner balcony newel-anchoring brackets, a terminating newel anchoring-bracket, a mid balcony newel-anchoring bracket, a curb wall landing newel-anchoring bracket, and a curb wall starting newel-anchoring bracket.

SUMMARY OF THE INVENTION

Brackets for anchorage of vertical construction members are provided. The brackets connect quickly to newels or other posts, and anchor anywhere on a floor or platform that has been built to code. Selected brackets may support a newel at the end of a balustrade, on the inside or outside corner of a balcony, or on a long balcony run where center support is critical. Selected brackets may secure a starting newel for a curb wall or a landing and simultaneously anchor the wall studding. The brackets are typically job-specific and therefore may satisfy current or future code requirements without costly failure.

BRIEF DESCRIPTION OF THE DRAWINGS

FIG. 8 is an isometric view of an Outside Corner Newel-Anchoring Bracket, according to an embodiment of the invention.

FIG. 9 is an isometric view of a Heavy-Duty Outside Corner Newel-Anchoring Bracket, according to an embodiment of the invention.

FIG. 10 is an isometric view of an assembled newel and balustrade section utilizing an Outside Corner Newel-Anchoring Bracket according to an embodiment of the invention.

FIG. 11 is a partial exploded view of the newel and balustrade section of FIG. 10, showing the placement of the Outside Corner Newel-Anchoring Bracket.

FIG. 12 is a partial exploded view from below of the newel and balustrade section of FIG. 10, showing the placement of the Outside Corner Newel-Anchoring Bracket.

FIG. 13 is an isometric partial view from below of the newel and balustrade section of FIG. 10, showing the placement of the Outside Corner Newel-Anchoring Bracket.

FIG. 19 is an isometric view of a Mid Balcony Newel-Anchoring Bracket.

FIG. 20 is an isometric view of an assembled newel and balustrade section utilizing a Mid Balcony Newel-Anchoring Bracket according to an embodiment of the invention.

FIG. 21 is a partial exploded view of the newel and balustrade section of FIG. 20, showing the placement of the Mid Balcony Newel-Anchoring Bracket.

FIG. 22 is an isometric partial view from below of the newel and balustrade section of FIG. 20, showing the placement of the Mid Balcony Newel-Anchoring Bracket.

FIG. 23 is a partial exploded view from below of the newel and balustrade section of FIG. 20, showing the placement of the Mid Balcony Newel-Anchoring Bracket.

FIG. 24 is an isometric view of a Curb Wall Landing Newel-Anchoring Bracket, according to an embodiment of the invention.

FIG. 25 is an exploded view from below showing how the Curb Wail Landing Newel-Anchoring Bracket of FIG. 24 assembles with a newel.

FIG. 26 is an isometric view, from below, of the newel and Curb Wall Landing Newel-Anchoring Bracket of FIG. 25.

FIG. 27 is an isometric view of the newel and Curb Wall Landing Newel-Anchoring Bracket of FIG. 25 in combination with a platform.

FIG. 28 is an exploded view from above showing how the Curb Wall Landing Newel-Anchoring Bracket of FIG. 24 assembles with a newel.

FIG. 29 is an isometric view of a Curb Wall Starting Newel-Anchoring Bracket, according to an embodiment of the invention.

FIG. 30. is an isometric front view of the Curb Wall Starting Newel-Anchoring Bracket of FIG. 29, in combination with a first stud, a wall plate, and a newel.

FIG. 31 is an exploded view of the Curb Wall Starting Newel-Anchoring Bracket, first stud, wall plate, and newel of FIG. 30.

FIG. 32 is an exploded rear view of the Curb Wall Starting Newel-Anchoring Bracket of FIG. 29, in combination with a first stud, a wall plate, a newel, and a stringer.

FIG. 33 is an isometric rear view of the Curb Wall Starting Newel-Anchoring Bracket, first stud, wall plate, newel, and stringer assembly of FIG. 32.

DETAILED DESCRIPTION OF THE INVENTION

Figure 1:
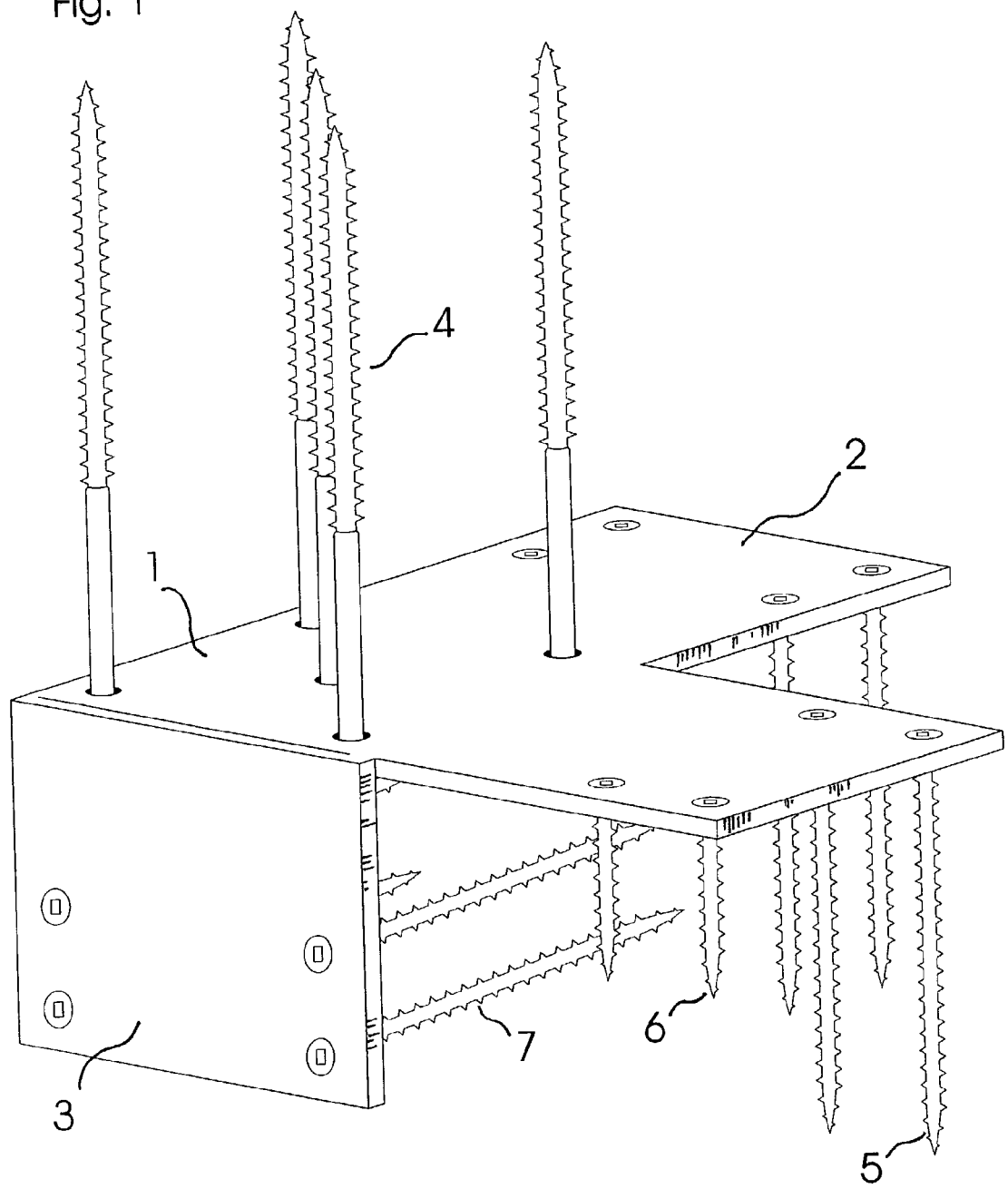
FIG. 1 is an isometric view of an Outside Corner Newel-Anchoring Bracket with screws in place, according to an embodiment of the invention.

FIG. 1 provides a close-up view of an Outside Corner Newel-Anchoring Bracket according to a selected embodiment of the invention. The anchoring bracket of FIG. 1 may be formed from 3/16" thick T1 steel, ASTM A514 Grade H, from U.S. Steel, or an equivalent material, and typically includes a plurality of apertures that permit the screw attachment of the bracket to both a newel post and the framing floor or platform.

The bracket includes a center square portion 1 that mounts to the transverse bottom of the newel. The center square portion of all the brackets that mount to a transverse bottom of a newel, either directly or through a plinth block, typically reach to within 1/4" of the edge of the newel.

The bracket further includes an extension flange 2 of a size equal to or larger than center square portion 1. This large flange provides increased resistance to downward pressure toward the direction of its extension and increased resistance to lifting pressure from the opposite direction of its extension, thus helping to prevent the newel from arching sideways when pressure is applied at the hand or guard rail height.

The bracket further includes a downward extension flange 3 of a size equal to or larger than the center square portion 1 that provides increased resistance to upward lifting pressure on the newel, and therefore resistance to lateral pressure on the newel at hand or guard rail height from the side of its anchorage.

Newel fastener 4 is a used to attach the bracket to softwood or hardwood newels. A plurality of fasteners is typically used to attach the bracket to the newel, and any fastener that serves to attach the bracket to the newel with sufficient strength and resilience is an appropriate fastener for the purposes of the invention. Typically, newel fastener 4 is a screw. The bracket may be used in combination with five 6.0 mm×120 mm or longer GRK self-threading, Climatek Plated, Structural Screws, or equivalent fasteners, for hardwood newel attachment. Alternatively, the bracket may be used in combination with five 6.0 mm×140 mm or longer GRK self-threading, Climatek Plated, Structural Screws, or equivalent fasteners, for softwood newel attachment.

The bracket may include a plurality of fasteners 5, 6, and 7. Fastener 5 is selected to be suitable for fastening the bracket through subflooring into joists. Fastener 5 may be a 3"×8 Woodtex screw, or an equivalent fastener. Fastener 6 is selected to be suitable for fastening the bracket to oriented strand board or plywood subflooring. Fastener 6 may be a 1 1/4"×8 Quickscrew, or an equivalent fastener. Fastener 7 is selected to be suitable for fastening the bracket into the side of one or more available joists. Fastener 7 may be a 3"×8 Woodtex screw, or an equivalent fastener.

Figure 2:
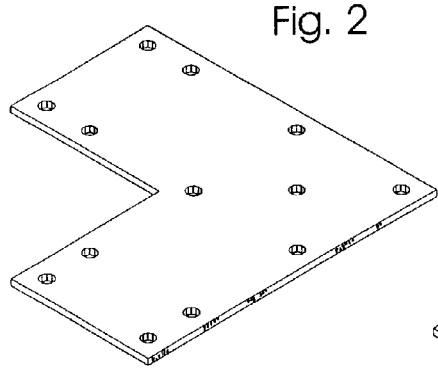
FIG. 2 is an isometric view of an Inside Corner Newel-Anchoring Bracket, according to an embodiment of the invention.
Figure 3:
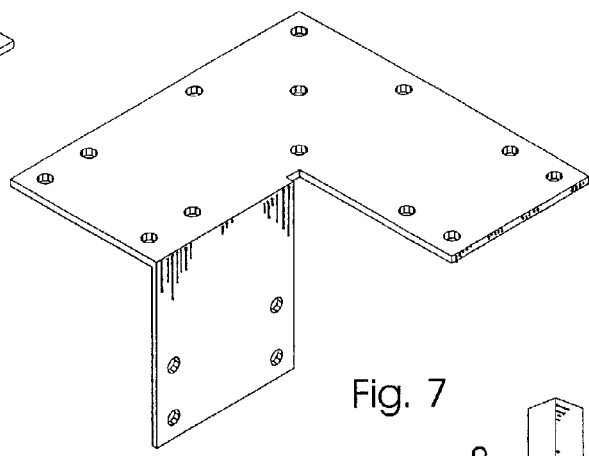
FIG. 3 is an isometric view of a Heavy-Duty Inside Corner Newel-Anchoring Bracket, according to an embodiment of the invention.

FIG. 2 provides a view of an Inside Corner Balcony Newel-Anchoring Bracket, according to a selected embodiment of the invention. The bracket is an "L"-shaped plate with two flange extensions. FIG. 3 provides a view of a Heavy Duty Inside Corner Newel-Anchoring Bracket, according to a selected embodiment of the invention. The bracket of FIG. 3 includes a right angle flange that permits screws to cross anchor the bracket to the surface of a floor or platform rim joist. This portion of the bracket may be hidden by the balcony trim.

Figure 4:
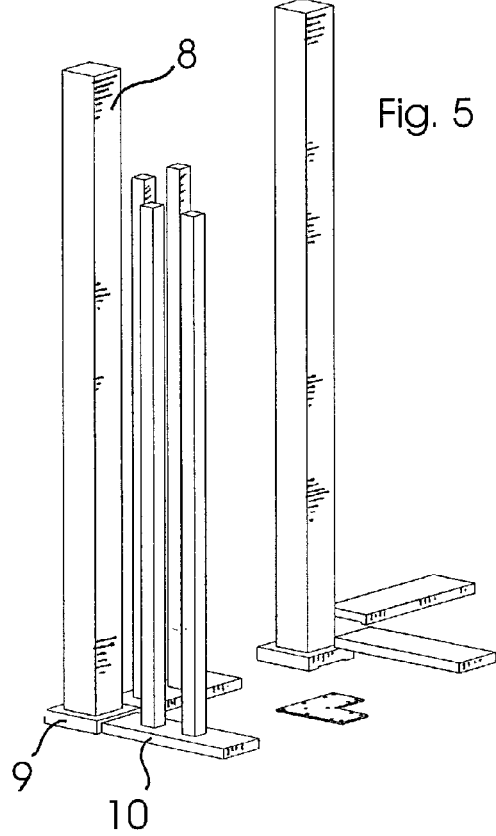
FIG. 4 is an isometric view of an assembled newel and balustrade section utilizing an Inside Corner Newel-Anchoring Bracket according to an embodiment of the invention.
Figure 5:
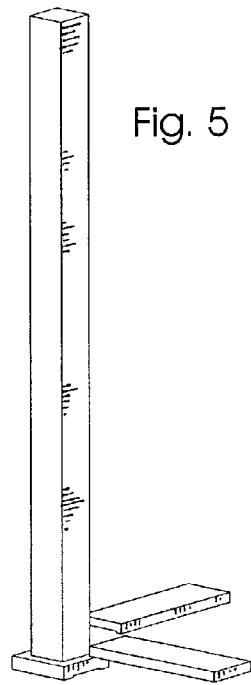
FIG. 5 is a partial exploded view of the newel and balustrade section of FIG. 4, showing the placement of the Inside Corner Newel-Anchoring Bracket.
Figure 6:
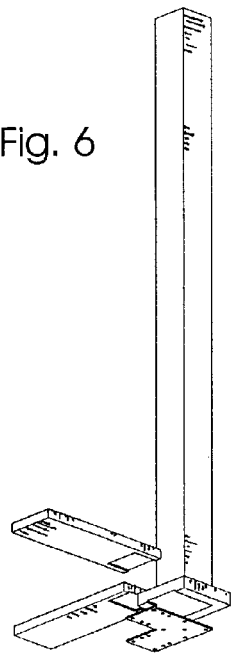
FIG. 6 is a partial exploded view from below of the newel and balustrade section of FIG. 4, showing the placement of the Inside Corner Newel-Anchoring Bracket.
Figure 7:
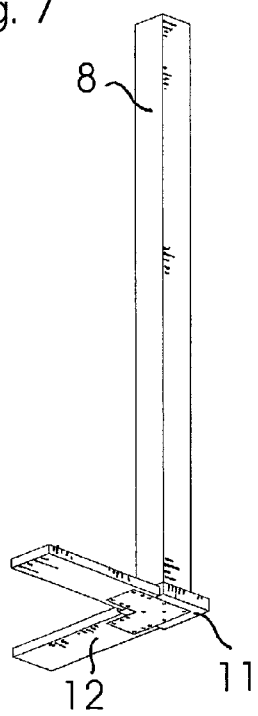
FIG. 7 is an isometric partial view from below of the newel and balustrade section of FIG. 4, showing the placement of the Inside Corner Newel-Anchoring Bracket.

FIG. 4 illustrates a preferred use of the Inside Corner Balcony Newel-Anchoring Bracket of FIG. 2. Where the bracket in place, as viewed from above with a newel 8, a plinth 9 and balustrade sections 10 in place, the bracket itself is virtually invisible. FIGS. 5 and 6 further illustrate how the assembly of FIG. 4 is constructed. FIG. 7 further demonstrates how the bracket may be concealed in the router-prepared plinth 11 and balustrade bottom plates 12.

An Outside Corner Balcony Newel-Anchoring Bracket according to a selected embodiment of the invention is shown in FIG. 8. The bracket of FIG. 8 is "L"-shaped plate that includes a right angle flange attached to the center square of the "L". A Heavy-Duty Outside Corner Newel-Anchoring Bracket according to another embodiment of the invention is shown in FIG. 9. The bracket of FIG. 9 includes two flanges extending downward from the center square for attachment to rim joist material, substantially as described above. These downward flanges are typically hidden by the balcony trim.

FIG. 10 illustrates a preferred use of the bracket of FIG. 8. As shown in FIG. 10, with the bracket, newel 8, plinth 9, and balustrade sections 10 in place, the bracket is virtually invisible. FIGS. 11 and 12 further illustrate how the assembly of FIG. 10 is constructed. FIG. 13 demonstrates how the bracket may be effectively concealed in a router-prepared plinth 11 and balustrade bottom plates 12.

Figure 14:
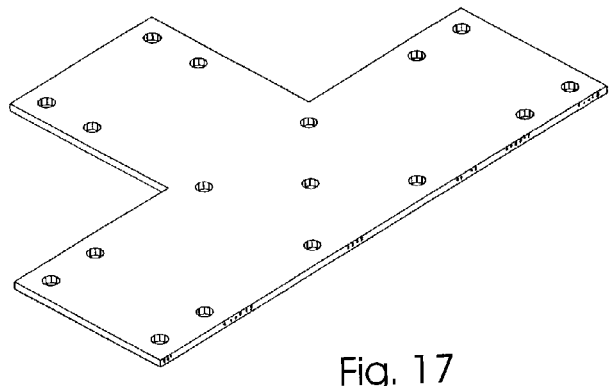
FIG. 14 is an isometric view of a Terminator Newel-Anchoring Bracket, according to an embodiment of the invention.

A Terminator Newel-Anchoring Bracket according to a selected embodiment of the invention is shown in FIG. 14. The bracket of FIG. 14 is a "T"-shaped plate that includes horizontal flanges extending from three sides of a square center section.

Figure 15:
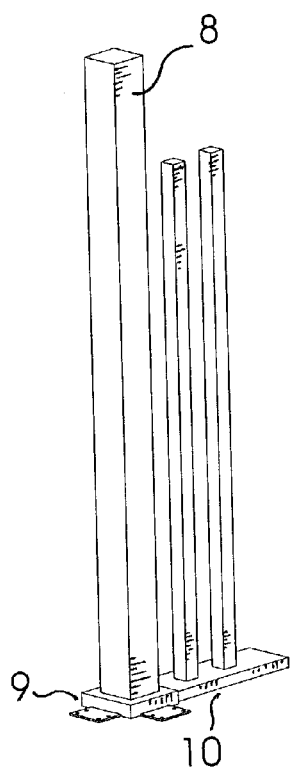
FIG. 15 is an isometric view of an assembled newel and balustrade section utilizing a Terminator Newel-Anchoring Bracket according to an embodiment of the invention.
Figure 16:
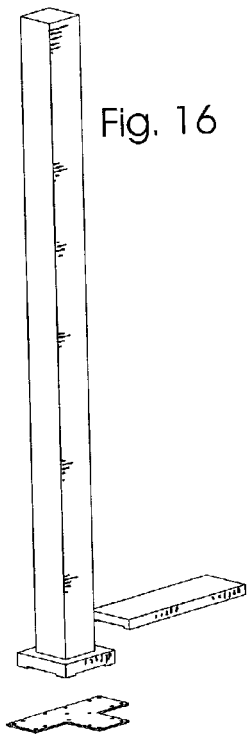
FIG. 16 is a partial exploded view of the newel and balustrade section of FIG. 15, showing the placement of the Terminator Newel-Anchoring Bracket.
Figure 17:
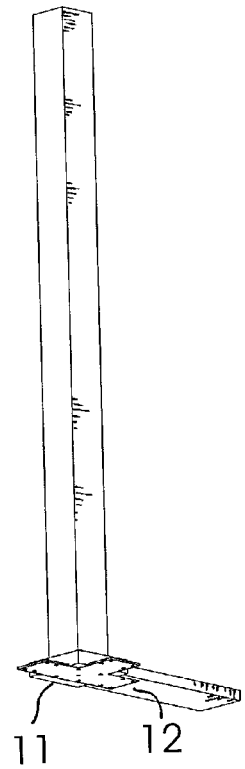
FIG. 17 is an isometric partial view from below of the newel and balustrade section of FIG. 15, showing the placement of the Terminator Newel-Anchoring Bracket.
Figure 18:
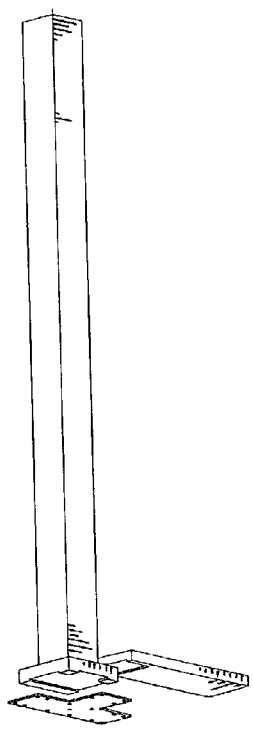
FIG. 18 is a partial exploded view from below of the newel and balustrade section of FIG. 15, showing the placement of the Terminator Newel-Anchoring Bracket.

FIG. 15 illustrates a preferred use of the bracket of FIG. 14. As shown in FIG. 15, as viewed from above with the bracket of FIG. 14, newel 8, plinth 9, and balustrade sections 10 in place, the bracket is virtually invisible. FIGS. 16 and 18 further illustrate how the assembly of FIG. 15 may be constructed. FIG. 17 demonstrates how the bracket may be effectively concealed in a router-prepared plinth 11 and balustrade bottom plate 12. FIG. 17 further illustrates how the two flanges on the bracket extend from non-balustrade sides to secure the terminal newel against lateral pressures directed toward the rail and pulling on the newel.

A Mid-Balcony Newel-Anchoring Bracket according to a selected embodiment of the invention is shown in FIG. 19. The bracket of FIG. 19 is a "T"-shaped plate that includes a descending flange attached to the center square portion of the "T". This portion of the bracket is typically hidden by the balcony trim.

FIG. 20 illustrates a preferred use of the bracket of FIG. 19. As viewed from above, with newel 8, plinth 9, and balustrade sections 10 in place, the bracket is virtually invisible. FIGS. 21 and 23 further illustrate how the assembly of FIG. 20 may be constructed. FIG. 22 demonstrates how the bracket may be effectively concealed in a router-prepared plinth 11 and balustrade bottom plates 12.

A Curb Wall Landing Newel-Anchoring Bracket according to a selected embodiment of the invention is shown in FIG. 24. The bracket of FIG. 24 consists of a square steel tube 14 having a large, bent, "L"-shaped plate having a long leg 15 and a short let 16 welded to the vertical center of tube 14 in a substantially horizontal orientation. The 'long' leg of "L"-shaped plate 15 abuts one side of tube 14, and the perpendicular short leg of the plate 16 extends away from tube 14. The outside surface of perpendicular leg 16 of the bent plate aligns with its adjacent tube wall. The bracket may include a plurality of apertures in the "L"-shaped plate to allow the fastening of the bracket to a floor or platform rim joist materials using lags, through bolts, or other appropriate fasteners.

FIGS. 25, 26, and 28 illustrate how a newel stub 13 fits into tube 14, while FIG. 27 illustrates a preferred embodiment of the bracket and newel assembly including lags or through bolts attaching legs 15 and 16 to rim joists 17 of a platform.

A Curb Wall Starting Newel-Anchoring Bracket according to a selected embodiment of the invention is shown in FIG. 29. The bracket of FIG. 29 is a large, bent, "L"-shaped plate having a plurality of apertures that permit the bracket to be fastened to stringers and/or tread supports using lags or through bolts, or other suitable fasteners. The bracket of FIG. 29 also includes apertures configured to secure a keylock 19 and a locking fastener 20, that permit bolting through a first stud for a stub wall installation. Curb Wall Starting Newel-Anchoring Brackets may be used in combination with Terminator Newel-Anchorage Brackets, as shown in FIGS. 30–33, for a particularly secure anchorage.

FIG. 31 illustrates a preferred use of the bracket of FIG. 29, that includes an initial stub 21 for a wall and a wall coverplate 22 routed for the keylock mechanism. FIGS. 32 and 33 shows the entire bracket and newel assembly in combination with a stringer 23.

The invention as disclosed herein may encompasses multiple, distinct inventions with independent utility. Independent inventions may be embodied in various combinations and subcombinations of particular features. The subject matter of the inventions includes all novel and non-obvious combinations and subcombinations of the various elements, features, functions and/or properties disclosed herein. Similarly, where the claims recite "a" or "a first" element or equivalent thereof, such claims should be understood to include incorporation of one or more such elements requiring nor excluding two or more such elements. Functions, elements and/or properties may be claimed through representation of new claims in one or more related applications without deviating from the scope of the subject matter of the present disclosure.

Although the present invention has been shown and described with reference to the foregoing operational principles and preferred embodiments, it is to be understood that the specific embodiments thereof as disclosed and illustrated herein are not to be considered in a limiting sense, and that no single feature, function, or property of a particular embodiment is essential. It will be apparent to those skilled in the art that various changes in form and detail may be made without departing from the spirit and scope of the invention. The present invention is intended to embrace all such alternatives, modifications and variances that fall within the scope of the appended claims.

What is claimed is:

1. A bracket for attaching a vertical construction member by its transverse end to the outside corner of a floor or platform, comprising:

a) a T-shaped plate having a cross bar and a lower stem, where the cross bar includes two side flanges and one center section, and the lower stem includes a side flange extending from the center section;

where the center section and each side flange has a size no less than ¼" smaller on all sides than the transverse end of the vertical construction member;

where the center section and each side flange includes a plurality of countersunk apertures, the center section apertures being countersunk from the opposite side of the side flange apertures;

where one of the side flanges of the cross bar extends downward at an angle of about 90 degrees with respect to the center section; and b) a plurality of fasteners for anchoring the center section to the transverse end of the vertical construction member; and c) a plurality of fasteners for anchoring each side flange to the floor or platform.

2. The bracket of claim 1, where the vertical construction member is a newel or post.

3. The bracket of claim 1, where the floor or platform is a framed floor, a concrete floor, or framed platform.

4. The bracket of claim 1, where the bracket comprises 3/16" thick T1 steel, ASTM A514 Grade H.

5. The bracket of claim 1, where the fasteners for anchoring the center section to the transverse end of the vertical construction member include at least five 6.0 mm×120 mm or longer self-threading screws, and the vertical construction member is a hardwood newel.

6. The bracket of claim 1, where the fasteners for anchoring the center section to the transverse end of the vertical construction member include at least five or more 6.0 mm×140 mm or longer self-threading screws, and the vertical construction member is a softwood newel.

7. The bracket of claim 1, where the fasteners for anchoring each side flange to the floor or platform include 3"×8 screws that are used to fasten the bracket through a sub-flooring to one or more available joists.

8. The bracket of claim 1, where the fasteners for anchoring each side flange to the floor or platform include 1¼"×8 screws that are used to fasten the bracket to oriented strand board or plywood subflooring.

9. The bracket of claim 1, where the fasteners for anchoring each side flange to the floor or platform include 3"×8 screws that are used to fasten the bracket into the side of one or more available joists.

10. The bracket of claim 1, where the fasteners for anchoring each side flange to the floor or platform include concrete screws that are used to fasten the bracket to concrete flooring.

11. The bracket of claim 1, further comprising an additional side flange extending from the center section on a side opposite the lower stem, where the additional side flange extends downward at an angle of about 90 degrees with respect to the center section.

12. A bracket for attaching a mid newel or post anchoring bracket by its transverse end to the outside corner of a floor or platform, comprising:

a) a T-shaped plate having a cross bar and a lower stem, where the cross bar includes two side flanges and one center section, and the lower stem includes a side flange extending from the center section, further comprising an additional side flange extending from the center section on a side opposite the lower stem, where the additional side flange extends downward at an angle of about 90 degrees with respect to the center section;

where the center section and each side flange has a size no less than ¼" smaller on all sides than the transverse end of the mid newel or post anchoring;

where the center section and each side flange includes a plurality of countersunk apertures, the center section apertures being countersunk from the opposite side of the side flange apertures; and b) a plurality of fasteners for anchoring the center section to the transverse end of the vertical construction member; and c) a plurality of fasteners for anchoring each side flange to the floor or platform.

13. A reversible bracket for anchoring a vertical construction member, comprising:

a) a bent L-shaped plate having a long leg and a short leg;

where the long leg includes a plurality of apertures configured to permit the bracket to be fastened to a stringer, a tread support, or both, using an appropriate fastener;

where the short leg includes a plurality of apertures configured to permit the bracket to be fastened to a first stud for a stub wall installation and into a keylock; and b) a bracket for attaching the vertical construction member by its transverse end to the outside corner of a floor or platform, comprising;

i) a T-shaped plate having a cross bar and a lower stem, where the cross bar includes two side flanges and one center section, and the lower stem includes a side flange extending from the center section;

where the center section and each side flange has a size no less than ¼" smaller on all sides than the transverse end of the vertical construction member;

where the center section and each side flange includes a plurality of countersunk apertures, the center section apertures being countersunk from the opposite side of the side flange apertures; and ii) a plurality of fasteners for anchoring the center section to the transverse end of the vertical construction member; and iii) a plurality of fasteners for anchoring each side flange to the floor or platform.

14. The reversible bracket of claim 13, where the reversible bracket is configured to a vertical construction member that is a newel or post at the start of a curb wall stair.

15. The reversible bracket of claim 13, where the bracket is configured to be fastened to a stringer, a tread support, or both, using lags or through bolts.

* * * * *